March 8, 1932. A. R. PRIBIL 1,848,144
PRESSED STEEL BALL BEARING WHEEL
Filed July 5, 1928
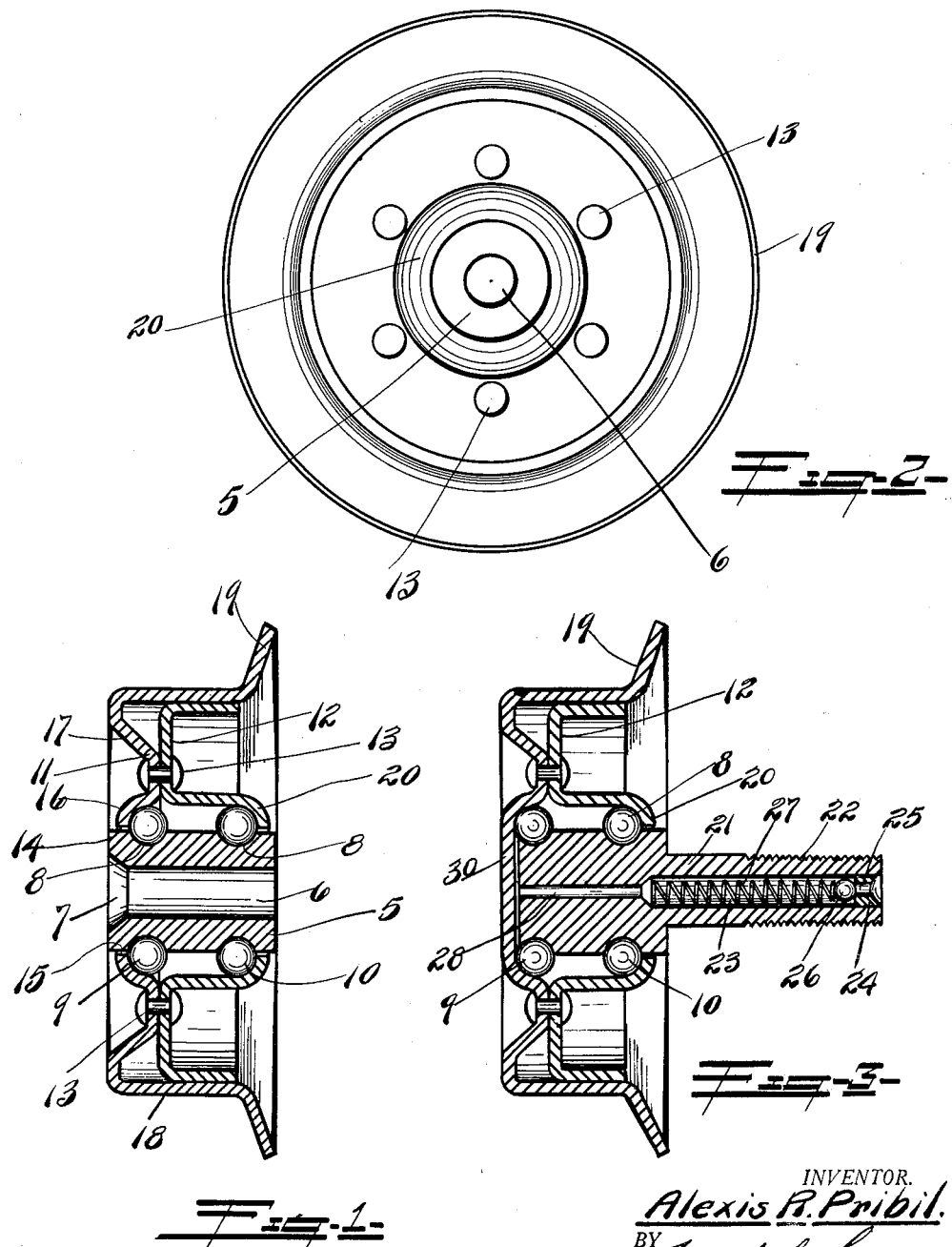
INVENTOR.
Alexis R. Pribil.
BY
Frank C. Forman
ATTORNEYS.

Patented Mar. 8, 1932

1,848,144

UNITED STATES PATENT OFFICE

ALEXIS R. PRIBIL, OF SAGINAW, MICHIGAN

PRESSED STEEL BALL BEARING WHEEL

Application filed July 5, 1928. Serial No. 290,295.

This invention relates to pressed steel ball bearing wheels for use on trolleys, conveyers, and devices of similar nature.

One object of the invention is to design a pressed steel wheel which can be formed of stampings, insuring accuracy and high speed production, and also provides anti-friction balls to insure smoothness and ease in operation.

Another object is to provide a pressed steel wheel which can be quickly and easily assembled, which is composed of few parts, and which forms a rigid and true structure when assembled.

A further object is to provide a pressed steel wheel having balls which take both radial and end thrust, which by reason of its construction and assembly insures accuracy and concentricity, and which is rigidly secured on the hub.

The above and other objects will appear as the specification progresses, reference being had to the accompanying drawings in which I have shown the preferred embodiment of my invention, and in which like reference numerals indicate like parts throughout the several views thereof.

In the drawings:

Fig 1 is a vertical sectional view of my improved wheel.

Fig. 2 is a rear view thereof.

Fig. 3 is a vertical sectional view showing an alternate construction with means for lubricating the anti-friction elements.

Referring now particularly to the construction shown in Figs. 1 and 2 of the drawings, the numeral 5 indicates a steel hub suitably heat treated and hardened, and having a centrally disposed opening 6, counter bored as shown at 7 to accommodate a bolt or the like, (not shown), for securing it in position.

The outer periphery of the hub is provided with a pair of spaced apart grooves 8 in which the rows of anti-friction balls 9 and 10 respectively are mounted in the usual manner.

The wheel comprises a pair of plates 11 and 12 (which are also carbonized and hardened), and which are rigidly secured together by means of spaced apart rivets 13, each plate being provided with a centrally disposed opening 14 and 15 respectively to slip over and accommodate the hub, and are so spaced as to evenly distribute the load on the bearing. The front plate 11 is shaped as clearly shown in Fig. 1, the metal directly adjacent the opening 14 being rounded as shown at 16 to form a race, thence extending vertically to form the web, thence being dished outwardly as shown at 17, and being turned to form the tread 18 which terminates in a marginal flange 19.

The central portion of the inner plate 12 is formed identically similar to the front plate, being rounded to fit over and form a race 20 which embrace the rear row of balls 10, continuing to the web, thence extending vertically, the outer rim thereof being turned and forming a press fit with and reinforcing the inner surface of the tread, providing an accurate and extremely rigid construction.

It will of course be understood that the tread can be formed at any desired angle, and that the marginal rim may be omitted if desired without departing from the spirit of the invention.

In Fig. 3 of the drawings I have shown a slightly different construction, the centrally disposed opening the hub being omitted, a reduced shank 21 being cast integral with the hub, the outer end being threaded as shown at 22 to receive a nut or the like.

The shank 21 is bored as shown at 23, the outer end being threaded to receive a plug 24 which is provided with an opening 25 extending therethrough, the outer end being shaped concave so that a standard grease gun, (not shown) may be fitted thereto. The inner end of the opening 25 is normally closed by means of a ball valve 26 which is held in position by means of the spring 27, the opening 23 communicating with a reduced passage 28 which leads through the hub, so that lubricant introduced through the passage 25, (under pressure) will be forced through the hub, and into the space between the end plate 29 and the end of the hub, this end plate being solid, and is dished as shown at 30 to permit the lubricant being forced to the balls, with the exception of this shank and end plate, the construction is otherwise identical with that shown in Figs. 1 and 2 of the drawings.

From the foregoing description it will be obvious that I have perfected a smooth running wheel, capable of heavy loads, which is very simple and substantial, and which can be economically manufactured and assembled.

What I claim is:—

1. A pressed steel wheel comprising in combination with a steel hub having a centrally disposed bore, spaced apart grooves in the outer periphery thereof, anti-friction balls mounted therein, a pair of plates mounted thereon and formed with centrally disposed openings adapted to embrace the hub, the marginal edges of said opening being rounded to form ball races, the outer plate being flanged to form a tread, the inner plate being also flanged to nest in and form a press fit with the tread portion of the outer plate.

2. A pressed steel wheel comprising in combination, a hub having spaced apart grooves, anti-friction balls mounted therein, a pair of plates mounted thereon and shaped to form races concentric with said grooves, the outer plate only being dished outwardly and is flanged to form a tread, the inner plate being also flanged to nest in and form a press fit with the tread portion of the outer plate.

3. A pressed steel wheel comprising in combination with a hub having ball grooves therein, balls mounted in said grooves, a lubricant passage therethrough, a plug in one end of said passage and formed with a concave outer end adapted to receive a grease gun, a passage through said plug, a spring actuated ball valve forming a closure therefor, and a pair of plates mounted on said balls and formed with races concentric with said grooves.

4. A pressed steel wheel comprising in combination with a hub provided with a laterally projecting shank, grooves in said hub, a lubricant passage extending through said hub, a plug in one end thereof a passage therethrough and terminating in a concave end adapted to receive a grease gun, and a spring actuated ball valve normally forming a closure for said passage, plates mounted on said hub, sections of said plates being shaped to form races concentric with said grooves.

In testimony whereof I hereunto affix my signature.

ALEXIS R. PRIBIL.